United States Patent
Huang et al.

(10) Patent No.: US 10,832,179 B2
(45) Date of Patent: Nov. 10, 2020

(54) METHOD FOR CONSTRUCTING A FUTURE-STATE POWER GRID MODEL, DEVICE AND EQUIPMENT AND STORAGE MEDIUM

(71) Applicants: CHINA ELECTRIC POWER RESEARCH INSTITUTE COMPANY LIMITED, Beijing (CN); STATE GRID CORPORATION OF CHINA, Beijing (CN); State Grid sichuan electric power company, Chengdu (CN)

(72) Inventors: Guodong Huang, Beijing (CN); Qiang Ding, Beijing (CN); Zelei Zhu, Beijing (CN); Sai Dai, Beijing (CN); Hui Cui, Beijing (CN); Dan Xu, Beijing (CN); Zhi Cai, Beijing (CN); Bo Li, Beijing (CN); Chenxu Hu, Beijing (CN); Chuancheng Zhang, Beijing (CN); Jinghua Yan, Beijing (CN); Deyue Men, Beijing (CN); Jiali Zhang, Beijing (CN); Peijun Li, Beijing (CN); Zhen Sun, Beijing (CN)

(73) Assignees: CHINA ELECTRIC POWER RESEARCH INSTITUTE CO. LTD., Beijing (CN); STATE GRID CORPORATION OF CHINA, Beijing (CN); STATE GRID SICHUAN ELECTRIC POWER COMPANY, Chengdu (CN)

(*) Notice: Subject to any disclaimer, the term of this patent is extended or adjusted under 35 U.S.C. 154(b) by 305 days.

(21) Appl. No.: 15/762,847
(22) PCT Filed: Sep. 19, 2017
(86) PCT No.: PCT/CN2017/102343
§ 371 (c)(1),
(2) Date: Mar. 23, 2018
(87) PCT Pub. No.: WO2018/196264
PCT Pub. Date: Nov. 1, 2018

(65) Prior Publication Data
US 2019/0108463 A1   Apr. 11, 2019

(30) Foreign Application Priority Data

Apr. 24, 2017   (CN) .......................... 2017 1 0270716

(51) Int. Cl.
G06Q 10/04   (2012.01)
G05B 23/02   (2006.01)
(Continued)

(52) U.S. Cl.
CPC ............. *G06Q 10/04* (2013.01); *G05B 23/02* (2013.01); *G06Q 10/06* (2013.01); *G06Q 50/06* (2013.01);
(Continued)

(58) Field of Classification Search
CPC ......... G06Q 10/04; G06Q 10/06; G06Q 50/06
See application file for complete search history.

(56) References Cited

U.S. PATENT DOCUMENTS

2012/0089384 A1* 4/2012 Coyne ..................... G06F 30/33
703/18
2013/0282189 A1* 10/2013 Stoupis ..................... H02J 3/00
700/286
(Continued)

FOREIGN PATENT DOCUMENTS

CN   101325337 A   12/2008
CN   101714241 A   5/2010
(Continued)

OTHER PUBLICATIONS

International Search Report in international application No. PCT/CN2017/102343, dated Jan. 29, 2018.
(Continued)

*Primary Examiner* — Vincent H Tran
(74) *Attorney, Agent, or Firm* — Syncoda LLC; Feng Ma

(57) ABSTRACT

Embodiments provide a method for constructing a future-state power grid model and device, including that: a current
(Continued)

power grid model, an equipment power-off plan, an equipment retirement plan and an equipment addition plan are acquired; then, equipment is added according to the current power grid model, and an added equipment information set, a retired equipment information set and a powered-off equipment information set are determined according to the equipment addition plan, the equipment retirement plan and the equipment power-off plan respectively; and finally, a state of the added equipment is set to be an operating state, an initial network model of each period is formed according to a time sequence, and a future-state network model is constructed according to the added equipment information set, the retired equipment information set, the powered-off equipment information set and the initial network models. The embodiments further provide construction equipment and a storage medium.

19 Claims, 1 Drawing Sheet

(51) Int. Cl.
*H02J 3/12* (2006.01)
*H02J 3/00* (2006.01)
*G06Q 50/06* (2012.01)
*G06Q 10/06* (2012.01)

(52) U.S. Cl.
CPC .................. *H02J 3/00* (2013.01); *H02J 3/12* (2013.01); *H02J 2203/20* (2020.01)

(56) References Cited

U.S. PATENT DOCUMENTS

| 2014/0148962 | A1 | 5/2014 | Venayagamoorthy |
| 2017/0131757 | A1* | 5/2017 | Zhou ........................ G06F 5/14 |

FOREIGN PATENT DOCUMENTS

| CN | 104463462 A | 3/2015 |
| CN | 106067071 A | 11/2016 |

OTHER PUBLICATIONS

The Written Opinion of the International Search Authority in international application No. PCT/CN2017/102343, dated Jan. 29, 2018.

* cited by examiner

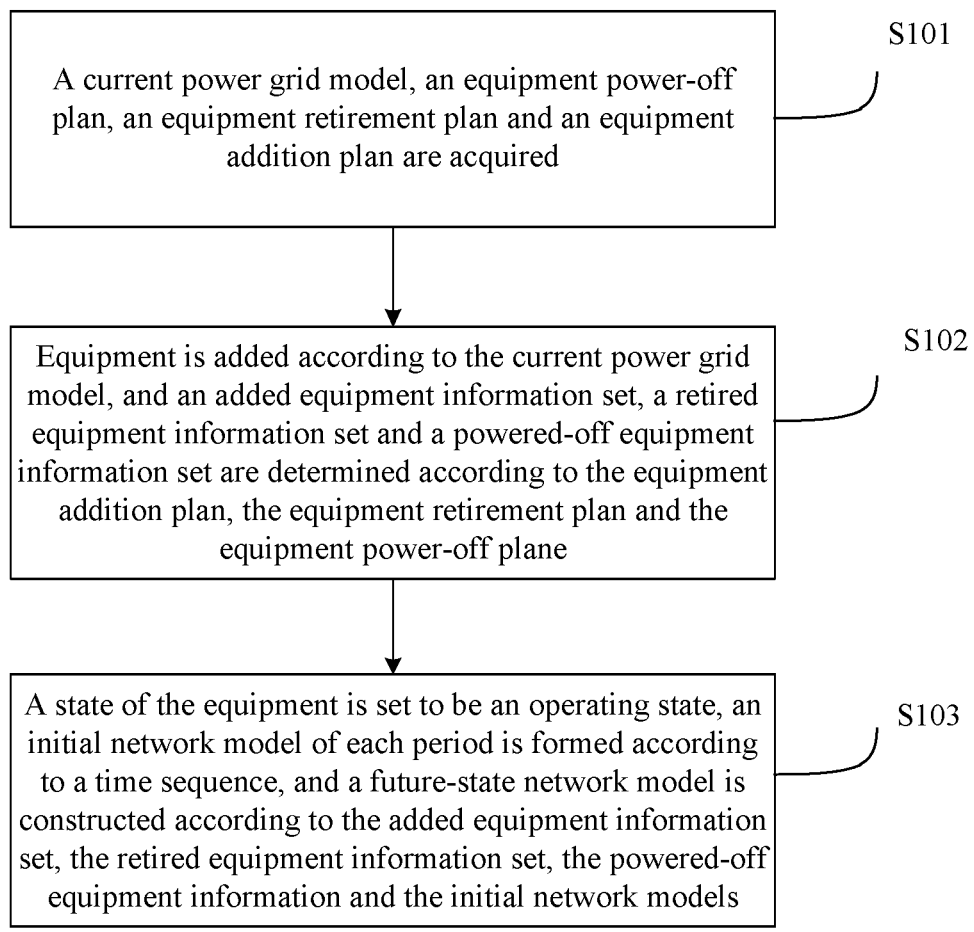

METHOD FOR CONSTRUCTING A FUTURE-STATE POWER GRID MODEL, DEVICE AND EQUIPMENT AND STORAGE MEDIUM

TECHNICAL FIELD

Embodiments of the disclosure relate to the technical field of dispatching planning of power systems, and particularly to a method for constructing a future-state power grid model, device and equipment and a computer storage medium.

BACKGROUND

At present, a day-ahead generation planning method adopting security constrained dispatching as a core technology has been widely applied to a power dispatching control center of each grid and province. Along with promotion of a power market and bilateral transactions, a feasible space of generation planning of a power grid gets strained year by year. On one aspect, a medium/long-term plan is required to be made more reasonably on the basis of fully considering various practical constraint conditions to ensure relatively higher executability of the generation plan to create a favorable condition for achieving an annual pre-control target and meet a subsequent operation requirement of the power grid. On the other aspect, it is necessary to analyze uncertain factors during operation of the power grid, identify a key boundary condition influencing execution of the generation plan, perform monitoring and early warning on it, and when the boundary condition has a relatively more significant change, timely provide a corresponding regulation strategy.

During long-term dispatching planning in a power system, it is usually necessary to perform simulation analysis on a future power grid, namely performing simulation analysis on a future-state power grid, and particularly when a power flow of the power system is calculated, a future-state power grid model is a basis for simulation analysis. In existing analysis manners, one is short-term simulation, and short-term simulation only considers a current power grid model and equipment overhauling plan; and another is long-term simulation, and long-term simulation only considers main grid equipment and performs maximum and minimum manner calculation, does not involve any detailed model for different periods, and may not meet a long-term dispatching planning requirement of a future multi-period power grid.

SUMMARY

In view of this, embodiments of the disclosure provide a method for constructing a future-state power grid model, device and equipment and a computer storage medium, so as to at least solve the problem of incapability of the abovementioned two types of simulation in meeting a dispatching requirement of a future power grid.

In order to achieve the purpose of the disclosure, the embodiments of the disclosure adopt the following technical solutions.

The embodiments of the disclosure provide a method for constructing a future-state power grid model, which includes that:

a current power grid model, an equipment power-off plan, an equipment retirement plan and an equipment addition plan are acquired;

equipment is added according to the current power grid model, and an added equipment information set, a retired equipment information set and a powered-off equipment information set are determined according to the equipment addition plan, the equipment retirement plan and the equipment power-off plan respectively; and a state of the added equipment is set to be an operating state, an initial network model of each period is formed according to a time sequence, and a future-state network model is constructed according to the added equipment information set, the retired equipment information set, the powered-off equipment information set and the initial network models.

The embodiments of the disclosure further provide a device for constructing a future-state power grid model, which includes:

an acquisition module, configured to acquire a current power grid model, an equipment power-off plan, an equipment retirement plan and an equipment addition plan;

a determination module, configured to add equipment according to the current power grid model, and determine an added equipment information set, a retired equipment information set and a powered-off equipment information set according to the equipment addition plan, the equipment retirement plan and the equipment power-off plan respectively; and a construction module, configured to set a state of the added equipment to be an outage state, form initial network models, and construct a future-state network model according to the initial network models.

The embodiments of the disclosure further provide equipment for constructing a future-state power grid model, which includes: a memory, a processor and a computer program stored on the memory and run by the processor, wherein the processor is connected with the memory, and is configured to run the computer program to execute the abovementioned method for constructing a future-state power grid model.

The embodiments of the disclosure provide a computer storage medium, in which a computer program is stored, the computer program being configured for the abovementioned method for constructing a future-state power grid model.

The technical solutions provided by the embodiments of the disclosure have the following beneficial effects.

According to the method for constructing a future-state power grid model provided by the embodiments of the disclosure, the current power grid model, the equipment power-off plan, the equipment retirement plan and the equipment addition plan are acquired at first; then, the equipment is added according to the current power grid model, and the added equipment information set, the retired equipment information set and the powered-off equipment information set are determined according to the equipment addition plan, the equipment retirement plan and the equipment power-off plan respectively; and finally, the state of the added equipment is set to be the outage state, the initial network models are formed, and the future-state network model is constructed according to the initial network models. Equipment commissioning, equipment retirement and equipment power-off overhauling are comprehensively considered, and construction of a future-state power grid model is implemented.

According to the technical solutions provided by the embodiments of the disclosure, a logic relationship of a topological structure is utilized, the added equipment is integrated into the current power grid model, and a power grid model of each period is generated period by period according to the time sequence to construct the future-state network model corresponding to each period. Therefore, a long-term dispatching planning requirement of a future multi-period power grid may be met.

According to the embodiments of the disclosure, factors such as equipment commissioning, equipment retirement and equipment power-off plans and a tie line equivalent are comprehensively considered, so that integrity and accuracy of the future-state power grid model are ensured. Moreover, the topological logic relationship is utilized for equipment connection, so that high construction speed of the power grid model is ensured.

According to the embodiments of the disclosure, state changes of equipment are scanned according to the time sequence to generate the power grid model of each period, i.e. the future-state power grid model of each period, and the state changes may be considered according to different time scales (month, day and hour) to accurately reflect sequential changes of a power grid state.

BRIEF DESCRIPTION OF THE DRAWINGS

FIG. 1 is a flowchart of a method for constructing a future-state power grid model according to an embodiment of the disclosure.

DETAILED DESCRIPTION

The embodiments of the disclosure will be further described below in combination with the drawings in detail. It should be understood that preferred embodiments described below are only adopted to describe and explain the disclosure and not intended to limit the embodiments of the disclosure.

Equipment commissioning, equipment retirement and equipment power-off overhauling are comprehensively considered, a topological logic relationship is utilized, added equipment is integrated into a current power grid model, a state of the added equipment is set to be an operating state, an initial network model of each period is formed according to a time sequence, and a future-state network model is constructed according to an added equipment information set, a retired equipment information set, a powered-off equipment information set and the initial network models. Therefore, a long-term dispatching planning requirement of a future multi-period power grid may be met. An embodiment of the disclosure provides a method for constructing a future-state power grid model. The method for constructing a future-state power grid model may be implemented as follows.

In S101, a current power grid model, an equipment power-off plan, an equipment retirement plan and an equipment addition plan are acquired.

In S102, equipment is added according to the current power grid model acquired in S101, and an added equipment information set, a retired equipment information set and a powered-off equipment information set are determined according to the equipment addition plan, equipment retirement plan and equipment power-off plane acquired in S101 respectively.

In S103, a state of the equipment added in S102 is set to be an operating state, an initial network model of each period is formed according to a time sequence, and a future-state network model is constructed according to the added equipment information set, retired equipment information set and powered-off equipment information set in S102 and the initial network models.

In S102, the operation that the equipment is added according to the current power grid model acquired in S101 may be implemented as follows: a power plant, a transformer substation, a unit, a transformer and a power transmission line are added. A specific process of adding the equipment may be described below respectively.

1) Addition of the power plant and the transformer substation may be implemented by setting generatrixes of each voltage class and topological numbers of the generatrixes.

2) Addition of the unit may be implemented by adding the unit in the power plant and setting a topological number of the unit according to a logic relationship to make the topological number of the unit consistent with the topological number of the generatrix with which the unit is connected. Here, the logic relationship may be a topological relationship between each piece of equipment in a power grid. Here, the topological relationship may include a circuit connection relationship.

3) Addition of the transformer may be implemented by setting a topological number of the transformer according to a connection relationship and connecting high, medium and low-voltage sides of the transformer to the generatrixes of the corresponding classes in the power grid respectively. A voltage of the high-voltage side of the transformer is higher than a voltage of the medium-voltage side, and the voltage of the medium-voltage side is higher than a voltage of the low-voltage side. Here, high, medium and low are relative to the transformer itself. In some other embodiments, the side of which the voltage is lower than a first specified voltage may be the low-voltage side, the side of which the voltage is higher than the first specified voltage and lower than a second specified voltage may be the medium-voltage side, and the side of which the voltage is higher than the second specified voltage may be the high-voltage side.

4) Addition of the power transmission line may be implemented by setting topological numbers of head and tail ends of the power transmission line to be consistent with the topological numbers of the generatrixes they are connected with respectively according to a connection relationship and voltage class of the power transmission line.

In S102, the added equipment information set, the retired equipment information set and the powered-off equipment information set are determined according to the equipment addition plan, the equipment retirement plan and the equipment power-off plan respectively through the following specific process:

1) the added equipment information set is determined according to the equipment addition plan, wherein the added equipment information set includes a name of the added equipment, a commissioning time of the added equipment and a topological number of the added equipment, and the commissioning time may be a time when the equipment is put into use;

2) the retired equipment information set is determined according to the equipment retirement plan, wherein the retired equipment information set includes a name of retired equipment, a retirement time and a topological number of the retired equipment, and the retirement time is a time when the equipment is stopped to be used; and 3) the powered-off equipment information set is determined according to the equipment power-off plan, wherein the powered-off equipment information set includes a name of powered-off equipment, a power-off starting time, a power-off ending time and a topological number of the powered-off equipment.

In S103, the future-state network model is constructed according to the added equipment information set, the retired equipment information set, the powered-off equipment information set and the initial network models through the following specific process:

an added equipment set, a retired equipment set and a powered-off equipment set are sequentially scanned on the basis of the initial network model of each period according to the time sequence, and a state of corresponding equipment is set to form a future-state power grid model.

The operation that the state of the corresponding equipment is set may include one or more of the following aspects:

1) if there exists the added equipment, the added equipment is set into the operating state;

2) if there exists the retired equipment in the retired equipment information set, the retired equipment is set into an outage state;

3) if there exists power-off started equipment in the powered-off equipment information set, the power-off started equipment is set into the outage state; and 4) if there exists power-off ended equipment in the powered-off equipment information set, the power-off ended equipment is set into the operating state.

According to the method for constructing a future-state power grid model provided by the embodiment of the disclosure, the current power grid model, the equipment power-off plan, the equipment retirement plan and the equipment addition plan are acquired at first; then, the equipment is added according to the current power grid model, and the added equipment information set, the retired equipment information set and the powered-off equipment information set are determined according to the equipment addition plan, the equipment retirement plan and the equipment power-off plan respectively; and finally, the state of the added equipment is set to be the outage state, the initial network models are formed, and construction of a future-state power grid model is finally implemented according to the initial network models, wherein a logic relationship of a topological structure is utilized, the added equipment is integrated into the current power grid model, and a power grid model of each period is generated period by period according to the time sequence to construct the future-state network model corresponding to each period. Therefore, a long-term dispatching planning requirement of a future multi-period power grid may be met. Here, the time sequence may be a time sequence corresponding to the commissioning time and retirement time of the equipment.

In addition, according to the embodiments of the disclosure, state changes of equipment are scanned according to the time sequence to generate the power grid model of each period, i.e. the future-state power grid model of each period, and the state changes may be considered according to different time scales (month, day and hour) to accurately reflect sequential changes of a power grid state. Factors such as equipment commissioning, equipment retirement and equipment power-off plans and a tie line equivalent are comprehensively considered, so that integrity and accuracy of the future-state power grid model are ensured. Moreover, the topological logic relationship is utilized for equipment connection, so that high construction speed of the power grid model is ensured.

An embodiment of the disclosure further provides a device for constructing a future-state power grid model. A principle for such equipment to solve the problem is similar to the abovementioned method for constructing a future-state power grid model, so that implementation of the equipment may refer to implementation of the method, and repeated parts will not be elaborated.

The device for constructing a future-state power grid model provided by the embodiment of the disclosure specifically includes an acquisition module, a determination module and a construction module. Functions of the three modules will be introduced below respectively.

The acquisition module may be configured to acquire a current power grid model, an equipment power-off plan, an equipment retirement plan and an equipment addition plan.

The determination module may be configured to add equipment according to the current power grid model, and determine an added equipment information set, a retired equipment information set and a powered-off equipment information set according to the equipment addition plan, the equipment retirement plan and the equipment power-off plan respectively.

The construction module may be configured to set a state of the added equipment to be an operating state, form an initial network model of each period according to a time sequence, and construct a future-state network model according to the added equipment information set, the retired equipment information set, the powered-off equipment information set and the initial network models.

The determination module adds the equipment according to the current power grid model through the following specific process:

1) a power plant and a transformer substation are added, which may be implemented by setting generatrixes of each voltage class and topological numbers of the generatrixes;

2) a unit is added, which may be implemented by adding the unit in the power plant and setting a topological number of the unit according to a logic relationship to make the topological number of the unit consistent with the topological number of the generatrix with which the unit is connected;

3) a transformer is added, which may be implemented by setting a topological number of the transformer according to a connection relationship and connecting high, medium and low-voltage sides of the transformer to the generatrixes of the corresponding classes in the power grid respectively; and 4) a power transmission line is added, which may be implemented by setting topological numbers of head and tail ends of the power transmission line to be consistent with the topological numbers of the generatrixes they are connected with respectively according to a connection relationship and voltage class of the power transmission line.

The determination module determines the added equipment information set, the retired equipment information set and the powered-off equipment information set according to the equipment addition plan, the equipment retirement plan and the equipment power-off plan respectively through the following specific process:

1) determining the added equipment information set according to the equipment addition plan, wherein the added equipment information set includes a name of the added equipment, a commissioning time of the added equipment and a topological number of the added equipment;

2) determining the retired equipment information set according to the equipment retirement plan, wherein the retired equipment information set includes a name of retired equipment, a retirement time and a topological number of the retired equipment; and 3) determining the powered-off equipment information set according to the equipment power-off plan, wherein the powered-off equipment information set includes a name of powered-off equipment, a power-off starting time, a power-off ending time and a topological number of the powered-off equipment.

The construction module constructs the future-state network model according to the added equipment information set, the retired equipment information set, the powered-off equipment information set and the initial network models through the following specific process:

sequentially scanning an added equipment set, a retired equipment set and a powered-off equipment set on the basis of the initial network model of each period according to the time sequence, and setting a state of corresponding equipment to form a future-state power grid model.

The operation that the construction module sets the state of the corresponding equipment may include one of the following conditions:

1) if there exists the added equipment, the added equipment is set into the operating state;

2) if there exists the retired equipment in the retired equipment information set, the retired equipment is set into an outage state;

3) if there exists power-off started equipment in the powered-off equipment information set, the power-off started equipment is set into the outage state; and 4) if there exists power-off ended equipment in the powered-off equipment information set, the power-off ended equipment is set into the operating state.

An embodiment of the disclosure provides equipment for constructing a future-state power grid model, which includes: a memory, a processor and a computer program stored on the memory and run by the processor, wherein the processor is connected with the memory, and is configured to run the computer program to execute one or more of the abovementioned method for constructing a future-state power grid model.

The memory may be storage equipment including various computer programs, and may be a random access memory or a read-only memory or a flash memory or the like.

The processor may be a processor such as an Application Processor (AP), a Central Processing Unit (CPU), a Digital Signal Processor (DSP) or a Field Programmable Gate Array (FPGA), and may be connected with the memory through a bus structure such as an integrated circuit bus.

The processor may execute the computer program stored on the memory to implement the method for constructing a future-state power grid model provided by one or more of the abovementioned technical solutions.

An embodiment of the disclosure further provides a computer storage medium, in which a computer program is stored, the computer program being configured to execute one or more of the abovementioned method for constructing a future-state power grid models.

The computer storage medium may be various types of storage media such as a mechanical hard disk, a solid-state drive, a mobile hard disk, a magnetic tape and an optical disk, and is optionally a non-transitory storage medium.

For convenient description, each part of the device is functionally divided into various modules or units for respective description. Of course, when the disclosure is implemented, a function of each module or unit is realized in one or more pieces of software or hardware.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, a Compact Disc Read-Only Memory (CD-ROM) and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

It should finally be noted that: the above embodiments are adopted to not limit but only describe the technical solutions of the embodiments of the disclosure, those skilled in the art may still make modifications or equivalent replacements to specific implementation modes of the disclosure with reference to the above embodiments, and any modifications or equivalent replacements made without departing from the spirit and scope of the disclosure shall fall within the scope of the claims of the disclosure applying for approval.

The invention claimed is:

1. A computer-implemented method for constructing a future-state power grid model, comprising:

acquiring a current power grid model, an equipment power-off plan, an equipment retirement plan and an equipment addition plan;

adding equipment according to the current power grid model, and determining an added equipment information set, a retired equipment information set and a powered-off equipment information set according to the equipment addition plan, the equipment retirement plan and the equipment power-off plan respectively; and setting a state of the added equipment to be an operating state, forming an initial network model of each period according to a time sequence, and constructing the future-state network model according to the added equipment information set, the retired equipment information set, the powered-off equipment information set and the initial network models.

2. The computer-implemented method for constructing a future-state power grid model according to claim 1, wherein adding the equipment according to the current power grid model comprises:
adding a power plant, a transformer substation, a unit, a transformer and a power transmission line.

3. The computer-implemented method for constructing a future-state power grid model according to claim 2, wherein adding the power plant and adding the transformer substation comprises:
setting generatrixes of each voltage class and topological numbers of the generatrixes.

4. The computer-implemented method for constructing a future-state power grid model according to claim 2, wherein adding the unit comprises:
adding the unit in the power plant and setting a topological number of the unit according to a logic relationship to make the topological number of the unit consistent with the topological number of the generatrix with which the unit is connected.

5. The computer-implemented method for constructing a future-state power grid model according to claim 2, wherein adding the transformer comprises:
setting a topological number of the transformer according to a connection relationship and connecting high, medium and low-voltage sides of the transformer to the generatrixes of the corresponding classes in the power grid respectively.

6. The computer-implemented method for constructing a future-state power grid model according to claim 2, wherein adding the power transmission line comprises:
setting topological numbers of head and tail ends of the power transmission line to be consistent with the topological numbers of the generatrixes they are connected with respectively according to a connection relationship and voltage class of the power transmission line.

7. The computer-implemented method for constructing a future-state power grid model according to claim 1, wherein determining the added equipment information set, the retired equipment information set and the powered-off equipment information set according to the equipment addition plan, the equipment retirement plan and the equipment power-off plan respectively comprises:
determining the added equipment information set according to the equipment addition plan,
the added equipment information set comprising a name of the added equipment, a commissioning time of the added equipment and a topological number of the added equipment.

8. The computer-implemented method for constructing a future-state power grid model according to claim 1, wherein determining the added equipment information set, the retired equipment information set and the powered-off equipment information set according to the equipment addition plan, the equipment retirement plan and the equipment power-off plan respectively comprises:
determining the retired equipment information set according to the equipment retirement plan,
the retired equipment information set comprising a name of retired equipment, a retirement time and a topological number of the retired equipment.

9. The computer-implemented method for constructing a future-state power grid model according to claim 1, wherein determining the added equipment information set, the retired equipment information set and the powered-off equipment information set according to the equipment addition plan, the equipment retirement plan and the equipment power-off plan respectively comprises:
determining the powered-off equipment information set according to the equipment power-off plan,
the powered-off equipment information set comprising a name of powered-off equipment, a power-off starting time, a power-off ending time and a topological number of the powered-off equipment.

10. The computer-implemented method for constructing a future-state power grid model according to claim 1, wherein constructing the future-state network model according to the added equipment information set, the retired equipment information set, the powered-off equipment information set and the initial network models comprises:
sequentially scanning an added equipment set, a retired equipment set and a powered-off equipment set on the basis of the initial network model of each period according to the time sequence, and setting a state of corresponding equipment to form a future-state power grid model.

11. The computer-implemented method for constructing a future-state power grid model according to claim 10, wherein setting the state of the corresponding equipment comprises:
if there exists the added equipment, setting the added equipment into the operating state;
if there exists the retired equipment in the retired equipment information set, setting the retired equipment into an outage state;
if there exists power-off started equipment in the powered-off equipment information set, setting the power-off started equipment into the outage state; and
if there exists power-off ended equipment in the powered-off equipment information set, setting the power-off ended equipment into the operating state.

12. A device for constructing a future-state power grid model, comprising:
a processor; and
a memory for storing instructions executable by the processor,
wherein the processor is arranged to:
acquire a current power grid model, an equipment power-off plan, an equipment retirement plan and an equipment addition plan;
add equipment according to the current power grid model, and determine an added equipment information set, a retired equipment information set and a powered-off equipment information set according to the equipment addition plan, the equipment retirement plan and the equipment power-off plan respectively; and
set a state of the added equipment to be an operating state, form an initial network model of each period according to a time sequence, and construct a future-state network model according to the added equipment information set, the retired equipment information set, the powered-off equipment information set and the initial network models.

13. The device for constructing a future-state power grid model according to claim 12, wherein adding the equipment according to the current power grid model comprises:
adding a power plant, comprising setting generatrixes of each voltage class and topological numbers of the generatrixes;
adding a unit, comprising adding the unit in the power plant and setting a topological number of the unit according to a logic relationship to make the topological number of the unit consistent with the topological number of the generatrix with which the unit is connected;

adding a transformer, comprising setting a topological number of the transformer according to a connection relationship and connecting high, medium and low-voltage sides of the transformer to the generatrixes of the corresponding classes in the power grid respectively; and adding a power transmission line, comprising setting topological numbers of head and tail ends of the power transmission line to be consistent with the topological numbers of the generatrixes they are connected with respectively according to a connection relationship and voltage class of the power transmission line.

14. The device for constructing a future-state power grid model according to claim 12, wherein determining the added equipment information set, the retired equipment information set and the powered-off equipment information set according to the equipment addition plan, the equipment retirement plan and the equipment power-off plan respectively comprises:

determining the added equipment information set according to the equipment addition plan, the added equipment information set comprising a name of the added equipment, a commissioning time of the added equipment and a topological number of the added equipment.

15. The device for constructing a future-state power grid model according to claim 12, wherein determining the added equipment information set, the retired equipment information set and the powered-off equipment information set according to the equipment addition plan, the equipment retirement plan and the equipment power-off plan respectively comprises:

determining the retired equipment information set according to the equipment retirement plan, the retired equipment information set comprising a name of retired equipment, a retirement time and a topological number of the retired equipment.

16. The device for constructing a future-state power grid model according to claim 12, wherein determining the added equipment information set, the retired equipment information set and the powered-off equipment information set according to the equipment addition plan, the equipment retirement plan and the equipment power-off plan respectively comprises:

determining the powered-off equipment information set according to the equipment power-off plan, the powered-off equipment information set comprising a name of powered-off equipment, a power-off starting time, a power-off ending time and a topological number of the powered-off equipment.

17. The device for constructing a future-state power grid model according to claim 12, wherein constructing the future-state network model according to the added equipment information set, the retired equipment information set, the powered-off equipment information set and the initial network models comprises:

sequentially scanning an added equipment set, a retired equipment set and a powered-off equipment set on the basis of the initial network model of each period according to the time sequence, and setting a state of corresponding equipment to form a future-state power grid model.

18. The device for constructing a future-state power grid model according to claim 17, wherein setting the state of the corresponding equipment comprises:

if there exists the added equipment, setting the added equipment into the operating state;

if there exists the retired equipment in the retired equipment information set, setting the retired equipment into an outage state;

if there exists power-off started equipment in the powered-off equipment information set, setting the power-off started equipment into the outage state; and if there exists power-off ended equipment in the powered-off equipment information set, setting the power-off ended equipment into the operating state.

19. A non-transitory computer storage medium having stored thereon a computer program configured to execute a method for constructing a future-state power grid model, the method comprising:

acquiring a current power grid model, an equipment power-off plan, an equipment retirement plan and an equipment addition plan;

adding equipment according to the current power grid model, and determining an added equipment information set, a retired equipment information set and a powered-off equipment information set according to the equipment addition plan, the equipment retirement plan and the equipment power-off plan respectively; and setting a state of the added equipment to be an operating state, forming an initial network model of each period according to a time sequence, and constructing the future-state network model according to the added equipment information set, the retired equipment information set, the powered-off equipment information set and the initial network models.

* * * * *